US012566893B1

(12) United States Patent
Kaplan et al.

(10) Patent No.: US 12,566,893 B1
(45) Date of Patent: Mar. 3, 2026

(54) CONTEXTUAL TRUST ASSESSMENT OF ELECTRONIC MESSAGES USING LARGE LANGUAGE MODELS IN COMPUTERIZED ORGANIZATIONAL NETWORKS

(71) Applicants: Elon Kaplan, Tel Aviv (IL); Maxim Rudnitsky, Kfar Saba (IL)

(72) Inventors: Elon Kaplan, Tel Aviv (IL); Maxim Rudnitsky, Kfar Saba (IL)

( * ) Notice: Subject to any disclaimer, the term of this patent is extended or adjusted under 35 U.S.C. 154(b) by 0 days.

(21) Appl. No.: 19/294,714

(22) Filed: Aug. 8, 2025

(51) Int. Cl.
G06F 21/64 (2013.01)
G06N 20/00 (2019.01)

(52) U.S. Cl.
CPC ............. *G06F 21/64* (2013.01); *G06N 20/00* (2019.01)

(58) Field of Classification Search
CPC ..... G06F 21/64; G06N 20/00; H04L 63/1416; H04L 63/1425; H04L 63/1433; H04L 63/1441; H04W 12/08; H04W 12/122
See application file for complete search history.

(56) References Cited

U.S. PATENT DOCUMENTS

| | | | | |
|---|---|---|---|---|
| 9,275,065 | B1 * | 3/2016 | Ganesh ................. | G06F 21/556 |
| 10,601,865 | B1 * | 3/2020 | Mesdaq ............. | H04L 63/1425 |
| 2016/0142435 | A1 * | 5/2016 | Bernstein ........... | H04L 63/1425 |
| | | | | 726/23 |
| 2019/0028421 | A1 * | 1/2019 | Duchastel ............. | H04L 51/226 |
| 2019/0349400 | A1 * | 11/2019 | Bruss .................... | G06N 20/00 |

| | | | | |
|---|---|---|---|---|
| 2020/0372575 | A1 * | 11/2020 | Kesiboyana ........... | G06Q 10/10 |
| 2022/0351744 | A1 * | 11/2022 | Krishnan .............. | G06N 3/0475 |
| 2024/0078257 | A1 * | 3/2024 | Barto .................. | G06F 9/44505 |
| 2025/0265179 | A1 * | 8/2025 | Kanagovi ........... | G06F 11/3684 |
| 2025/0278737 | A1 * | 9/2025 | Pascual .............. | H04L 63/1483 |
| 2025/0348126 | A1 * | 11/2025 | Crane ................... | G06F 1/3215 |

OTHER PUBLICATIONS

Laowaphong et al., "Safe, Suspicious, or Phishing? Classifying SMS with LLMs," 2025 SICE Festival with Annual Conference (SICE FES) Year: 2025 | Conference Paper | Publisher: IEEE.*
Reddy et al., "Using AI to Detect and Classify Suspicious Mobile Messages in Real Time," 2025 3rd International Conference on Intelligent Data Communication Technologies and Internet of Things (IDCIoT) Year: 2025 | Conference Paper | Publisher: IEEE.*

* cited by examiner

*Primary Examiner* — Roderick Tolentino
(74) *Attorney, Agent, or Firm* — The Roy Gross Law Firm, LLC; Roy Gross

(57) ABSTRACT

A computer-implemented method comprising: receiving an electronic message at an endpoint device associated with an organization; analyzing the electronic message by a local agent executed on the endpoint device; classifying the electronic message into one of a plurality of trust levels by the local agent; generating, by the local agent, a real-time alert or action at the endpoint device based on the classification; transmitting, by the local agent, metadata associated with the electronic message and its classification to a centralized machine learning engine; and updating, by the centralized machine learning engine, one or more machine learning models based on aggregated metadata received from a plurality of endpoint devices, wherein the one or more updated machine learning models are used to improve subsequent classification of electronic messages at the endpoint devices.

20 Claims, 7 Drawing Sheets

1

CONTEXTUAL TRUST ASSESSMENT OF ELECTRONIC MESSAGES USING LARGE LANGUAGE MODELS IN COMPUTERIZED ORGANIZATIONAL NETWORKS

BACKGROUND

The invention relates to the field of cyber security.

Organizations increasingly rely on electronic communication channels, such as email, instant messaging, and collaboration platforms, to facilitate internal operations and external interactions. The proliferation of these communication tools has introduced significant challenges related to the security and integrity of organizational information.

Fraudulent activities exploiting electronic communication channels have become a persistent threat to organizations. Attackers may impersonate trusted individuals or entities to deceive recipients into divulging sensitive information, authorizing financial transactions, or performing actions that compromise organizational assets. Such attacks can take various forms, including: Business Email Compromise (BEC): Attackers impersonate executives or business partners to manipulate employees into transferring funds or disclosing confidential data. Phishing and Spear Phishing: Fraudulent messages are crafted to appear legitimate, often targeting specific individuals with personalized content to increase the likelihood of success. Internal Impersonation: Malicious actors, including compromised insiders, may exploit internal communication channels to pose as colleagues or superiors, thereby bypassing traditional security measures.

These fraudulent schemes are often sophisticated, leveraging social engineering tactics and knowledge of organizational structures to increase their effectiveness. The consequences of successful fraud can include financial loss, reputational damage, and regulatory penalties.

Information leakage, whether intentional or inadvertent, presents another critical concern for organizations. Sensitive data—including intellectual property, customer information, and strategic plans—may be exposed through electronic communications in several ways: Unauthorized Data Sharing: Employees may inadvertently or deliberately transmit confidential information to unauthorized recipients, both inside and outside the organization. Exfiltration by Malicious Insiders: Individuals with legitimate access to sensitive data may misuse their privileges to extract and disclose information for personal gain or competitive advantage. Exploitation of Communication Channels: Attackers may exploit vulnerabilities in messaging platforms to intercept, redirect, or manipulate data in transit, leading to unauthorized disclosure.

The complexity of modern organizational structures, combined with the high volume and velocity of electronic messages, makes it challenging to detect and prevent information leakage. Traditional security controls, such as perimeter defenses and static access controls, may be insufficient to address the dynamic and context-dependent nature of these risks.

Efforts to mitigate fraud and information leakage are complicated by several factors: Evolving Attack Techniques: Adversaries continuously adapt their methods to evade detection, employing advanced technologies such as artificial intelligence to craft convincing fraudulent messages. Insider Threats: Not all risks originate from external actors; trusted insiders may intentionally or unintentionally contribute to information compromise. Volume and Diversity of Communications: The sheer number of electronic messages exchanged daily, across various platforms and devices, increases the difficulty of comprehensive monitoring and analysis. Contextual Complexity: Effective risk assessment often requires understanding the context of communications, including the roles and relationships of participants, the sensitivity of the information involved, and organizational policies.

Given these challenges, organizations face ongoing difficulties in safeguarding sensitive information and maintaining trust in their electronic communications.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a computer-implemented method comprising: receiving an electronic message at an endpoint device associated with an organization; analyzing the electronic message by a local agent executed on the endpoint device, based on: (i) data sensitivity associated with the content of the electronic message, (ii) communication behavior baselines of a sender and a recipient of the electronic message, (iii) job roles of the sender and the recipient, and an organizational hierarchy listing the job roles, and (iv) one or more enterprise security policies of the organization; classifying the electronic message into one of a plurality of trust levels by the local agent, wherein the trust levels comprise at least: (a) a trusted level permitting fulfillment of the message, (b) a suspicious level requiring human verification, and (c) a blocked level preventing fulfillment of the message unless explicitly approved; generating, by the local agent, a real-time alert or action at the endpoint device based on the classification, the alert or action comprising at least one of: (i) permitting the message to be viewed by the recipient, (ii) requiring additional verification before permitting the message to be viewed by the recipient, (iii) blocking the message from being reviewed by the recipient, or (iv) displaying, to the recipient, an indicator respective of the classification; transmitting, by the local agent, metadata associated with the electronic message and its classification to a centralized machine learning engine; and updating, by the centralized machine learning engine, one or more machine learning models based on aggregated metadata received from a plurality of endpoint devices, wherein the one or more updated machine learning models are used to improve subsequent classification of electronic messages at the endpoint devices.

In some embodiments, the analyzing of the electronic message by the local agent comprises operating a Large Language Model (LLM).

In some embodiments, the operating of the LLM comprises evaluating data sensitivity of the message content, by detecting at least one of: confidential terms, financial data, or personally identifiable information.

In some embodiments, the operating of the LLM comprises evaluating communication behavior baselines for the sender and the recipient by comparing at least one or: historical patterns, typical linguistic characteristics, tone, or structure, against the electronic message.

In some embodiments, the operating of the LLM comprises evaluating job roles of the sender and recipient respective of organizational hierarchy information, by querying a directory service of the organization.

In some embodiments, the operating of the LLM comprises retrieving and evaluating enterprise security policies applicable to the sender and the recipient.

In some embodiments, the method further comprises operating the local agent to normalize protocol-specific message content and metadata originating from a plurality of communication channels by extracting header fields, message bodies, attachments, and contextual signals into a standardized data structure configured for automated analysis.

In some embodiments, the method further comprises operating the local agent to apply both rule-based filters and at least one lightweight machine learning classifier to the electronic message, to assign a priority label to the electronic message prior to said analyzing.

In some embodiments, the centralized machine learning engine: executes a vectorization pipeline that generates multi-dimensional embeddings of content, style, and recipient context of the electronic message, using a transformer-based large language model; and compares the generated multi-dimensional embeddings to a database of threat pattern vectors, to compute a similarity score indicative of potential impersonation and/or potential data exfiltration.

In some embodiments, responsive to classification of the electronic message to the suspicious or the blocked trust levels, the local agent or central server: initiates an authentication workflow comprising at least one of: two-factor authentication, biometric verification, a challenge-response protocol, or escalation to a designated security officer; and records the authentication outcome as feedback for subsequent retraining of the one or more machine learning models.

Another embodiment relates to a computer-implemented method comprising: receiving, at a central server associated with an organization, an electronic message addressed to an endpoint device; analyzing, by the central server, the electronic message based on: (i) data sensitivity associated with the content of the electronic message, (ii) communication behavior baselines of a sender and a recipient of the electronic message, (iii) job roles of the sender and the recipient, and an organizational hierarchy listing the job roles, and (iv) one or more enterprise security policies of the organization; classifying, by the central server, the electronic message into one of a plurality of trust levels, wherein the trust levels comprise at least: (a) a trusted level permitting fulfillment of the message, (b) a suspicious level requiring human verification, and (c) a blocked level preventing fulfillment of the message unless explicitly approved; generating, by the central server, and based on the classification, a real-time alert or action directed to the endpoint device, the alert or action comprising at least one of: (i) permitting the message to be viewed by the recipient, (ii) requiring additional verification before permitting the message to be viewed by the recipient, or (iii) blocking the message from being reviewed by the recipient, or (iv) displaying an indicator respective of the classification; transmitting, by the central server, metadata associated with the electronic message and its classification to a machine learning engine; and updating, by the machine learning engine, one or more machine learning models based on aggregated metadata received in association of multiple electronic messages, wherein the one or more updated machine learning models are used to improve subsequent classification of electronic messages at the central server.

A further embodiment relates to a computer program product comprising a non-transitory computer-readable storage medium having program code embodied therewith, the program code executable by at least one hardware processor to execute any of the method steps discussed above.

A further embodiment relates to a system comprising: an endpoint device; and a central machine learning engine, wherein the endpoint device and the central machine learning server are respectively configured to execute any of the method steps discussed above.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
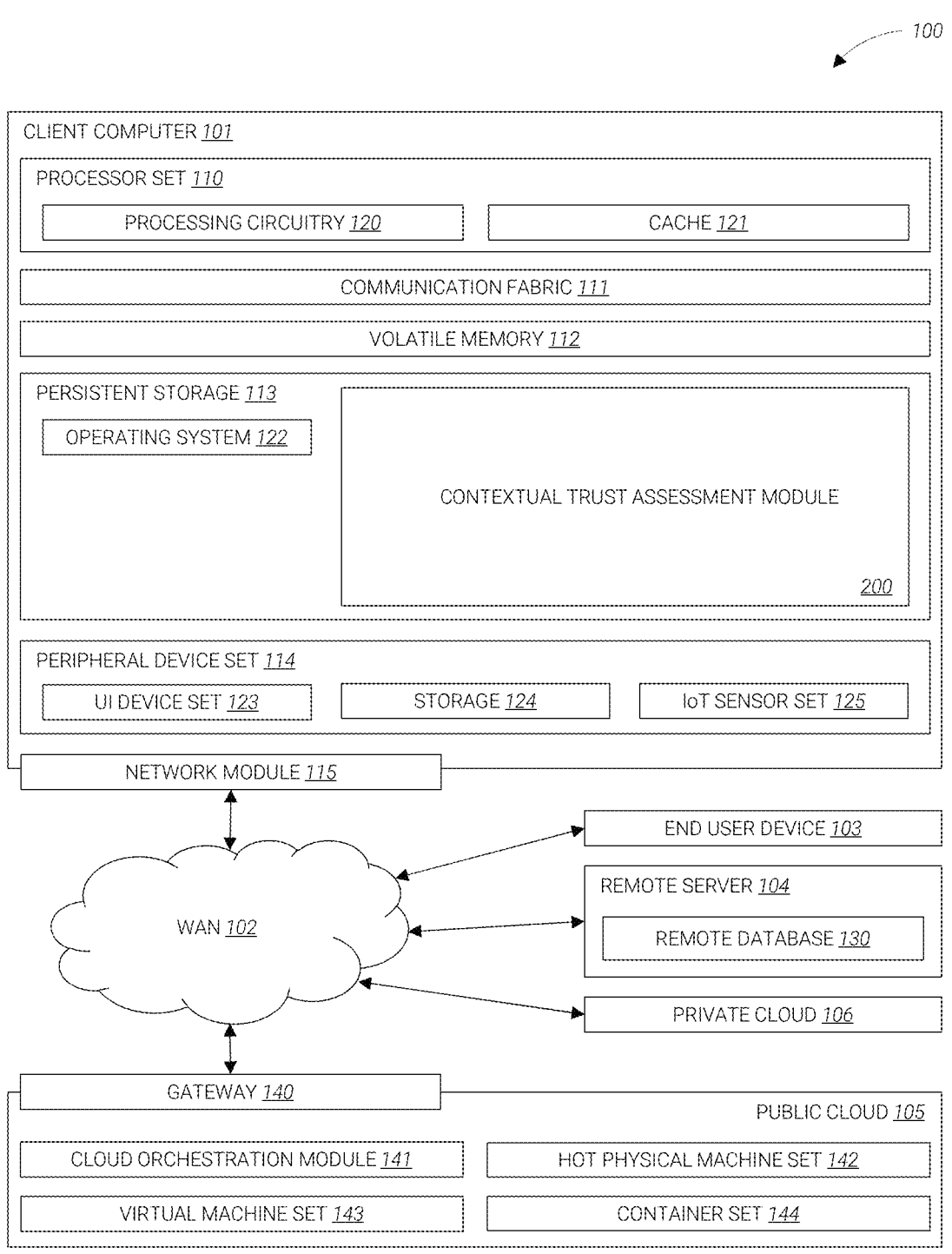
FIG. 1 is a block diagram of an exemplary computing environment configured with a contextual trust assessment functionality, according to an embodiment.

Disclosed herein are systems, methods, and computer program products for contextual trust assessment of electronic messages in organizational networks. In particular, disclosed embodiments provide techniques for analyzing, classifying, and acting upon electronic messages within organizations, with the aim of enhancing the security and integrity of electronic communications. Embodiments of the invention are directed to both endpoint-based and centralized approaches for evaluating electronic messages, leveraging behavioral, role-based, and policy-driven models to assess trust and manage risks associated with fraud and information leakage.

Modern organizations rely extensively on electronic messages-such as emails, instant messages, and other digital communications—to conduct daily operations. These electronic messages may be exchanged internally among employees or externally with third parties. The increasing sophistication of fraudulent schemes and the potential for inadvertent or malicious information leakage have highlighted the need for advanced mechanisms to evaluate the trustworthiness of such communications in real time.

The disclosed embodiments provide a computer-implemented method for receiving and analyzing electronic messages addressed to or originating from endpoint devices associated with an organization. This disclosure contemplates two principal embodiments: (1) a distributed approach in which analysis is performed locally at endpoint devices by a local agent, and (2) a centralized approach in which analysis is performed by a central server associated with the organization.

In the distributed approach, an endpoint device associated with an organization may receive an electronic message via an internal or external communication channel. A local agent executed on the endpoint device may analyze the electronic message based on at least one of: data sensitivity associated with the content of the message; communication behavior baselines of the sender and recipient; job roles of the sender and recipient and an organizational hierarchy listing, inter alia, these job roles; or one or more enterprise security policies of the organization.

The local agent may classify the electronic message into one of a plurality of trust levels. The trust levels may include, for example, a trusted level (permitting fulfillment of the message), a suspicious level (requiring human verification), and a blocked level (preventing fulfillment of the message unless explicitly approved). Based on the classification, the local agent may generate a real-time alert or action at the endpoint device, which may include, for example: permitting the message to be viewed by the recipient, requiring additional verification before permitting the message to be viewed by the recipient, blocking the message from being reviewed by the recipient, and/or displaying, to the recipient, an indicator respective of the classification next to, inside, or over the message.

Metadata associated with the electronic message and its classification may be transmitted by the local agent to a centralized machine learning engine. The machine learning engine may update one or more machine learning models (such as behavioral, role-based, and/or policy models) based on aggregated metadata received from a plurality of such endpoint devices. The one or more updated models may be used to improve subsequent classification of electronic messages at the endpoint devices.

In the centralized approach, a central server associated with the organization may receive an electronic message addressed to an endpoint device. The central server may analyze the electronic message based on at least one of: data sensitivity associated with the content of the message; communication behavior baselines of the sender and recipient; job roles of the sender and recipient and an organizational hierarchy listing, inter alia, these job roles; or one or more enterprise security policies of the organization.

The central server may classify the electronic message into one of a plurality of trust levels, which may include a trusted level, a suspicious level, and a blocked level, as described above. The central server may generate a real-time alert or action directed to the endpoint device based on the classification, which may include permitting the message, requiring additional verification, blocking the message, and/or displaying an indicator respective of the classification next to, inside, or over the message-similar to the types of alerts and actions discussed above.

Metadata associated with the electronic message and its classification may be transmitted by the central server to a machine learning engine. The machine learning engine may update one or more machine learning models (such as behavioral, role-based, and/or policy models) based on aggregated metadata received from a plurality of electronic messages, and the one or more updated models may be used to improve subsequent classification of electronic messages at the central server.

The disclosed techniques enable contextual and adaptive trust assessment of electronic messages. By considering factors such as data sensitivity, communication behavior baselines, job roles, organizational hierarchy, and enterprise policies, present embodiments provide a flexible and scalable framework for evaluating the risk associated with electronic messages. The use of real-time alerts and actions facilitates timely intervention in response to suspicious or potentially harmful communications.

Present embodiments further contemplate the use of centralized learning engines to aggregate metadata and refine behavioral, role-based, and policy models over time. This adaptive approach enables the system to respond to evolving threats and organizational changes, thereby enhancing the effectiveness of trust assessment for electronic messages.

The techniques described herein may be implemented in computer systems of a variety of organizational environments, including but not limited to corporate enterprises, governmental agencies, educational institutions, and healthcare organizations. The invention is not limited to any specific type of electronic message, endpoint device, or communication protocol, and may be adapted to accommodate different organizational structures, security policies, and regulatory requirements.

Reference is now made to FIG. 1, which shows a block diagram of an exemplary computing environment 100, containing an example of an environment for the execution of at least some of the computer code involved in performing the inventive methods, such as a contextual trust assessment module 200. In addition to block 200, computing environment 100 includes, for example, a computer 101, a wide area network (WAN) 102, an end user device (EUD) 103, a remote server 104, a public cloud 105, and/or a private cloud 106. In this example, computer 101 includes a processor set 110 (including processing circuitry 120 and a cache 121), a communication fabric 111, a volatile memory 112, a persistent storage 113 (including an operating system 122 and block 200, as identified above), a peripheral device set 114 (including a user interface (UI), a device set 123, a storage 124, and an Internet of Things (IoT) sensor set 125), and a network module 115. Remote server 104 includes a remote database 130. Public cloud 105 includes a gateway 140, a cloud orchestration module 141, a host physical machine set 142, a virtual machine set 143, and a container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible.

Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as a network interrace controller (NIC), a modem, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through the hardware included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
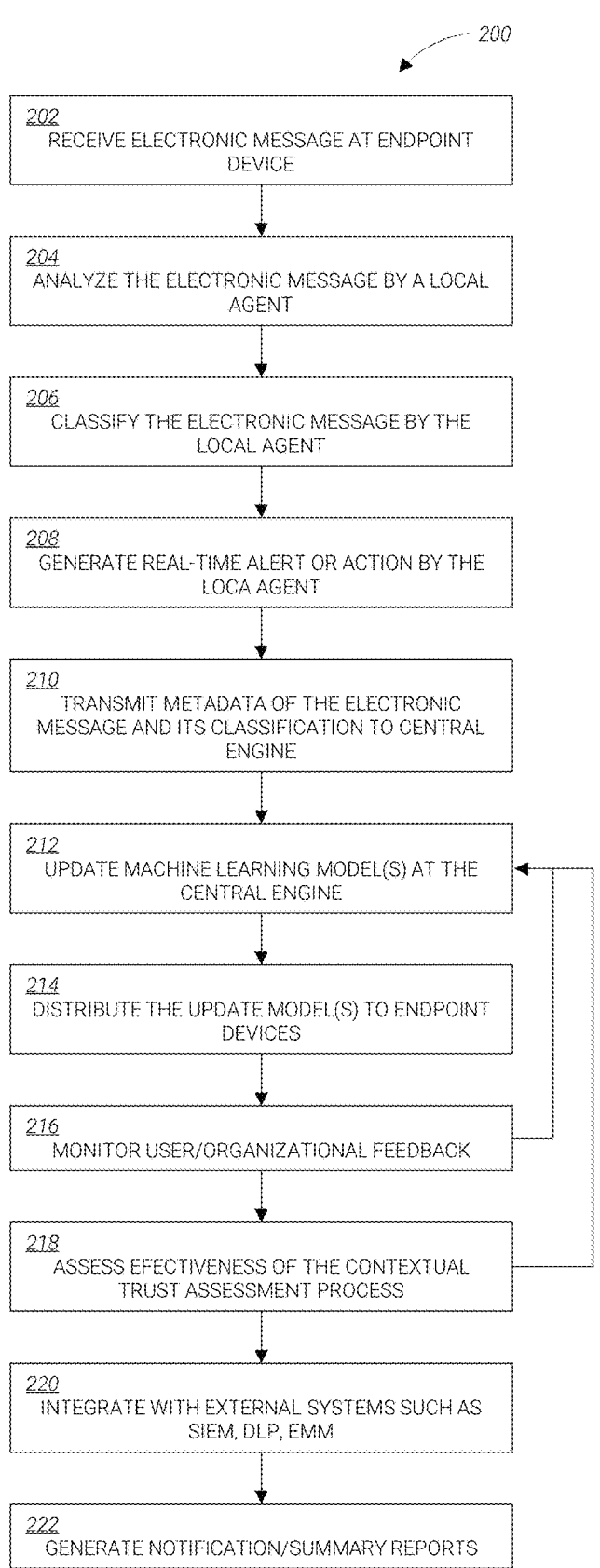
FIG. 2 is a flowchart of a method for contextual trust assessment, according to an embodiment.

The instructions of block 200 are now discussed with reference to the flowchart of FIG. 2, which illustrates a method 200 for contextual trust assessment, in accordance with an embodiment.

Steps of method 200 may be performed in the order they are presented, or in another suitable order (including in parallel), as long as necessary inputs for a given step are available from outputs of prior steps. Unless indicated otherwise, the steps of method 200 may be executed automatically by one or more computing elements, such as a local agent executed on an endpoint device or other computer systems within an organizational environment.

Those skilled in the art will recognize that various implementation details and alternatives may be applicable depending on system architecture, user preferences, network conditions, and organizational requirements. Further details and examples are provided in the respective step descriptions below.

In a step 202, an electronic message may be received at an endpoint device associated with an organization. The electronic message may be an email, instant message, chat, system notification, or any type of a unitary digital communication. Alternatives include receiving multiple messages in batch. The endpoint device may be a workstation, a laptop computer, a mobile computing device, a virtual desktop, or any other computing platform operable by one or more users of the organization.

In a step 204, the electronic message may be analyzed by a local agent executed on the endpoint device. As used herein, a "local agent" may refer to a software component, program, or process capable of running autonomously or semi-autonomously on the endpoint device. The local agent may be implemented as a background service, application, system extension, or middleware module configured to monitor, intercept, and analyze electronic communications received at the endpoint device. In various embodiments, the local agent may be installed by organizational IT administrators and may operate with configurable privileges, allowing it to access message content, metadata, system logs, or other contextual information as needed for trust assessment. The local agent may communicate with central management servers or machine learning engines to receive policy updates, download new models, and/or transmit aggregated assessment results, using secure communication channels. In some embodiments, the local agent may be updated remotely or may undergo periodic integrity checks to ensure reliable and secure operation.

The analysis by the local agent may be based on at least one of several features, each of which may be implemented as follows.

(i) Data sensitivity associated with the content of the electronic message may be determined by applying content inspection techniques such as keyword matching against predefined lists of confidential terms, pattern recognition for the detection of account numbers, financial data, and/or personally identifiable information (PII), and/or natural language processing techniques, such as LLMs, configured to identify sensitive, regulatory, proprietary, or otherwise risky content.

The local agent may maintain or reference one or more sensitivity classification dictionaries or machine learning models (such as LLMs) for this purpose, which may be updated by the organization.

(ii) Communication behavior and content baselines for the sender and recipient may be established and continuously updated by monitoring both historical communication patterns and the typical linguistic and contextual characteristics of message content. For communication behavior, the local agent may record parameters such as typical recipients, frequency and timing of correspondence, average message size, routine channels of communication, and/or access patterns within a local or centralized database. Baselines in the content of messages may be formed by analyzing regular language style, subject lines, types of requests, tone, formatting, and even the types of attachments usually sent between specific correspondents.

Anomalies in the current message—whether behavioral or content-based—may be flagged by comparing attributes of the message to these established baselines using statistical, rule-based, and/or machine learning models. For example, in the context of financial fraud, the local agent may detect a spoofed message allegedly from the CEO instructing the CFO to urgently wire funds to an external account. If this request's language differs from the CEO's typical communication style, contains unusual payment instructions, invokes secrecy, or requests actions outside usual business processes, it may be flagged as suspicious. As a specific example, attackers may impersonate a CEO or a high-level executive and craft messages with urgent tones or requests for large, confidential wire transfers associated with fake acquisitions or mergers, sometimes instructing the recipient not to inform others due to the "sensitive" nature of the transaction. Similarly, for attempts to extract confidential or sensitive data, the agent may compare requests for internal reports, employee tax forms, trade secrets, or customer databases against content baselines. If someone posing as a supervisor suddenly requests large downloads of proprietary files, customer PII, or intellectual property, the shift from the norm may signal an exfiltration attempt. Real-world cases include insiders or attackers requesting document access links, database exports, and/or lists of employee records under false pretenses, again typically using urgent or secretive language meant to override standard verification checks.

Baselines for both communication behavior and message content may be set and refined manually or automatically, as well as adjusted or approved by IT administrators through management systems, ensuring that the detection of anomalies is tailored to the organization's evolving risk landscape.

(iii) Job roles of the sender and recipient may be identified by querying organizational directory services—such as Lightweight Directory Access Protocol (LDAP) directories, Active Directory, and/or human resources databases—which may return titles, departments, and reporting structures. The local agent may utilize such information, along with an organizational hierarchy structure, to assess whether the content and context of the message are appropriate given the respective positions or responsibilities of the sender and recipient.

(iv) One or more enterprise security policies of the organization may be applied by retrieving applicable policy definitions from a central policy engine, configuration files, rule repositories, and/or compliance modules. These policies may be evaluated in the context of both the sender and the recipient of the electronic message. For example, policies may specify permitted and prohibited types of content that may be sent by certain job roles or between specified departments, approved communication channels for particular sender-recipient pairs, or access privileges and escalation procedures tailored to the sensitivity of communications between these roles. Policies may also define review procedures or require multi-level approvals when messages originate from, or are addressed to, users in high-risk or privileged positions. The policy logic may be expressed in formats such as Boolean logic, decision trees, or machine-readable languages including extensible Access Control Markup Language (XACML), and may reference attributes specific to the sender (such as job title, security clearance, or recent behavioral history) as well as to the recipient (such as role-based permissions or team assignments). The local agent may periodically synchronize policy updates with a central server, receiving context-specific policy rules or overrides that are dynamically determined based on the roles, device contexts, and/or alert histories associated with both the sender and the recipient. In some embodiments, policy enforcement may be further adjusted in real time based on current threat intelligence or incident response priorities relating to the involved parties.

Alternative embodiments may employ only a subset of these analytical features, dynamically select features based on message type or user profile, and/or further extend analysis to include additional context such as temporal metadata (e.g., time of day analysis to detect abnormal activity windows), message frequency thresholds, device geolocation obtained via operating system APIs or network location, and/or other contextual factors that may increase analytical precision or adaptivity.

In step 206, the local agent may classify the electronic message into one of a plurality of trust levels. Exemplary trust levels include: (a) a trusted level, permitting fulfillment of the message (e.g., immediate delivery to the recipient with no restrictions); (b) a suspicious level, requiring human verification (e.g., notification to a supervisor, security operator, or recipient confirmation); and (c) a blocked level, preventing fulfillment of the message unless explicit approval is obtained, such as via incident response workflows. Additional trust levels may be defined, such as "review required" or "external legal review." Classification may utilize rule-based logic, statistical methods, and/or machine learning models, with thresholds configurable by organizational policy.

In step 208, the local agent may generate a real-time alert or an action at the endpoint device based on the classification determined in step 206. The alert or action may include, for example: (i) permitting the message to be viewed by the recipient; (ii) requiring additional verification before permitting viewing, such as multi-factor authentication, recipient self-attestation, or supervisor approval; (iii) blocking the message from being reviewed by the recipient, either temporarily or permanently; and/or (iv) displaying to the recipient an indicator respective of the classification, which may take the form of banners, color cues, icons, and/or contextual popups. Alternative embodiments may involve escalation to a central security team, automatic redaction of sensitive content, and/or dynamic access revocation.

In step 210, the local agent may transmit metadata associated with the electronic message and its classification to a centralized machine learning engine. The metadata may comprise message characteristics, sender/recipient information, analysis results, trust level assigned, and/or any user or administrative actions taken in response. The transmission may occur immediately, on a schedule, and/or in response to specific triggers, and may employ secure, encrypted channels to maintain confidentiality. In some embodiments, partial or anonymized metadata may be sent.

In a step 212, the centralized machine learning engine may update one or more machine learning models based on aggregated metadata received from a plurality of endpoint devices. This update may include retraining, recalibration, refinement, and/or fine-tuning of classification, behavioral, and/or policy models so as to improve the accuracy and efficacy of subsequent message classification at endpoint devices. In some embodiments, the centralized engine may utilize a large language model (LLM) to assist in these tasks. For example, the LLM may be employed to analyze aggregated message content and metadata in order to detect novel attack patterns, extract emerging threat indicators, and/or automatically generate new classification rules and policies based on trends not previously encountered. The LLM may interpret context-rich information, simulate advanced adversarial scenarios, and/or provide natural language explanations of its classification decisions, thereby enabling automated policy refinement or human-in-the-loop review. The LLM may support updating the models by generating synthetic training data, suggesting modifications to existing classification thresholds, and/or highlighting areas where additional human labeling or adjustment is warranted.

In step 214, the updated machine learning models may be distributed back to endpoint devices or be made available for endpoint agents. In some embodiments, the models may be configured adaptively, allowing endpoints to dynamically select the most relevant model based on device type, user role, and/or risk context. In some embodiments, the central engine may maintain audit logs of model updates and endpoint deployments for compliance and monitoring purposes.

In a step 216, the local agent or, in some embodiments, a central server of the organization, may monitor user and/or organizational feedback in response to alerts issued and/or actions taken. For example, recipient overrides, approvals, and/or incident reports may be tracked either locally by the agent at the endpoint device or centrally by the server aggregating such feedback from multiple devices. Such feedback may be used to fine-tune classification thresholds and/or enrich training datasets in subsequent learning cycles, for example to update the machine learning models as discussed in the context of step 212 above.

In a step 218, periodic or event-driven analytics may be performed to assess the effectiveness of the contextual trust assessment process. Analytics may include detection rates of risky communications, false positive/negative analysis, user satisfaction measures, and/or adaptation to emerging communication threats. These analytics may be presented in the form of management dashboards and/or compliance reports. These analytics may be used to update the machine learning models as discussed in the context of step 212 above.

In a step 220, optional integration with external systems such as Security Information and Event Management (SIEM), Data Loss Prevention (DLP), or Enterprise Mobility Management (EMM) systems may be implemented. This integration may expand the contextual data available for trust assessment or facilitate automated incident response actions.

In a step 222, notification or summary reports may be generated and delivered to organizational stakeholders. Reports may address detected threats, trends, and improvement opportunities. Report formats may be customized for different audiences, such as technical teams, compliance officers, or executive management.

In various embodiments, one or more of steps 214 through 222 may be further refined, omitted, or performed in alternative sequences, depending on implementation needs and organizational requirements. The method may support configuration and extension for use with new types of electronic messages, evolving threat models, and/or varying regulatory landscapes.

While method 200 involves substantial execution steps of an endpoint device, an alternative method may centralize execution on one or more central servers, intercepting electronic messages before they are delivered to or viewed on endpoint devices. This centralized approach may provide benefits such as consolidated policy enforcement, scalable computational resources, and the ability to aggregate and analyze communication metadata across multiple endpoints for enhanced trust assessment. The centralized approach may be particularly beneficial for organizations using cloud-based (rather than on-premises) electronic messaging systems, such as Microsoft 365 offered by Microsoft Corporation of Redmond, WA, or Google Workspace offered by Google LLC of Mountain View, CA.

The central server may receive an electronic message destined for an endpoint device within the organization. Such electronic messages may encompass various digital communications including, but not limited to, emails, instant messages, system notifications, or other unitary message types transmitted via internal or external communication networks.

Upon receipt, the central server may analyze the electronic message using a variety of contextual and content-based features. The analysis may be based, at least in part, on factors such as (i) data sensitivity associated with the message content, which may be evaluated by inspecting message bodies, attachments, or metadata for confidential information, personally identifiable information, or other regulated data; (ii) communication behavior baselines previously established for both the sender and the recipient, which represent typical communication patterns including frequency, timing, message size, linguistic style, and recipient lists; (iii) the respective job roles of the sender and recipient, as well as their positions within an organizational hierarchy, which may be obtained from directory services or human resources information systems; and (iv) one or more enterprise security policies, which may define permissible communication activities, content restrictions, escalation procedures, and verification requirements applicable to specific senders, recipients, or message types.

Based on the comprehensive analysis, the central server may classify the electronic message into one of a plurality of predefined trust levels. Exemplary trust levels may include, but are not limited to: (a) a trusted level, wherein the message is permitted to be fulfilled, such as delivered directly to the recipient without restrictions; (b) a suspicious level, wherein the message's processing is deferred pending additional human verification or automated checks; and (c)

a blocked level, wherein delivery or content access is prevented unless explicit approval or override is granted.

Subsequent to classification, the central server may generate a real-time alert or action directed to the endpoint device and its user. Such alert or action may include selectively permitting the recipient to view the message; requiring one or more additional verification steps prior to message access, such as multi-factor authentication, supervisor approval, or challenge-response protocols; blocking the message from being viewed entirely; and/or displaying an on-device indicator or visual cue representative of the message's assigned trust level. These real-time interventions aim to mitigate risks associated with fraudulent impersonation, data leakage, or policy violations.

In some embodiments, the central server may transmit metadata pertaining to the electronic message and its classification to a centralized machine learning engine. This metadata may include message features, sender/recipient attributes, classification results, and any user actions taken in response to alerts. The machine learning engine may aggregate such metadata from multiple endpoint devices and messages to iteratively update one or more machine learning models utilized for message classification. Model updates may involve retraining, recalibration, or fine-tuning using supervised or semi-supervised learning techniques to improve detection accuracy, reduce false positives and negatives, and adapt to evolving organizational communication patterns and emerging threats.

Updated machine learning models generated by the central engine may be transmitted back to the central server for use in subsequent classification of electronic messages, thereby enabling continuous improvement of the trust assessment process.

This centralized processing architecture may be implemented in various organizational scenarios, including enterprises with distributed endpoints, governmental agencies requiring stringent communications monitoring, or other environments where centralized policy control and comprehensive threat analysis provide operational advantages.

In a particular embodiment discussed below, an exemplary system for contextual trust assessment may be implemented to provide real-time protection against attacks, such as AI-generated impersonation attacks and internal data exfiltration within organizational networks. This embodiment employs a receiver-side defense paradigm that coordinates advanced endpoint agents, prioritized streaming architectures, orchestrated AI-based threat analysis, and feedback-driven continuous learning pipelines, as shown in FIGS. 3 through 12.

Figure 3:
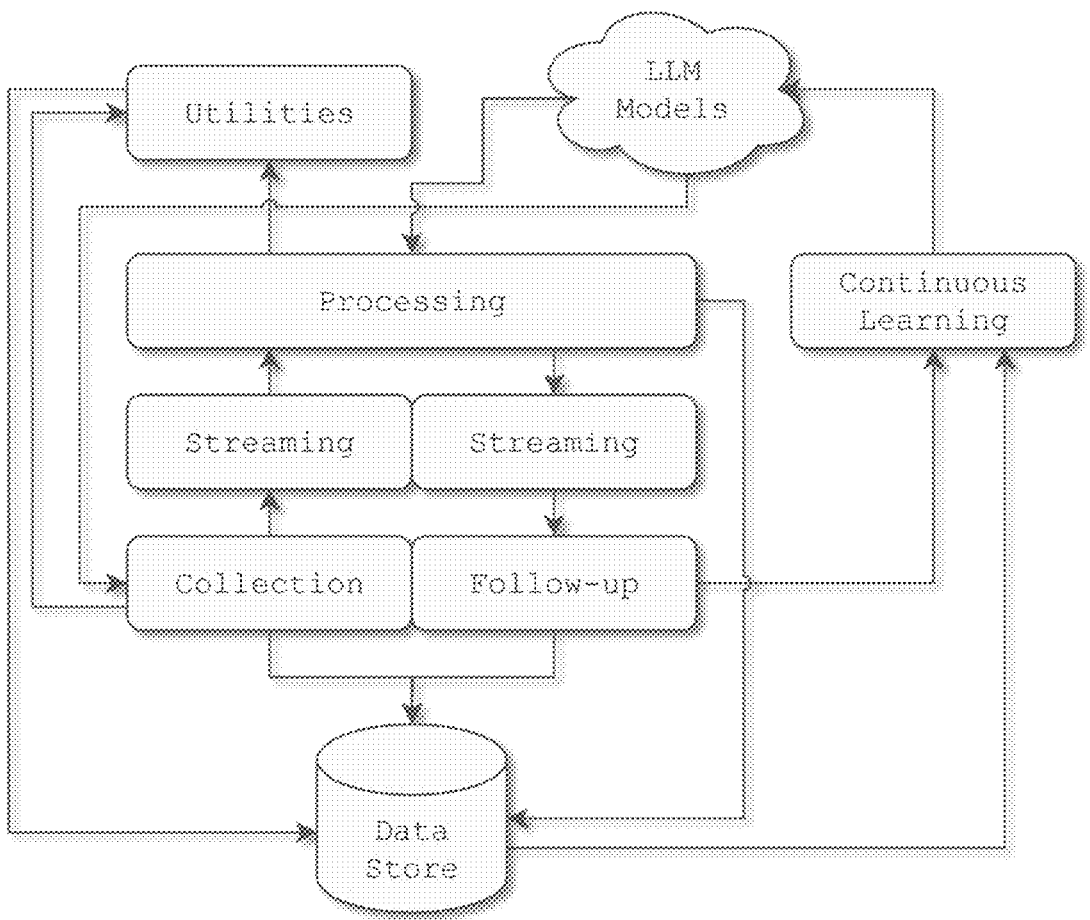
FIG. 3 is a flow diagram of an exemplary embodiment of a contextual trust assessment system.

FIG. 3 illustrates a system architecture encompassing seven functional components: (1) Endpoint Agent, (2) Streaming Manager, (3) Processing Manager, (4) LLM Engine, (5) Utilities, (6) Follow-up (Responder), and (7) Analytics and Continuous Learning Component. Together, these modules facilitate efficient collection, prioritized movement, contextual analysis, and dynamic response to threat events across an enterprise environment.

Endpoint Agent Component—Data Collection and Initial Classification

Figures 4, 5, 6:
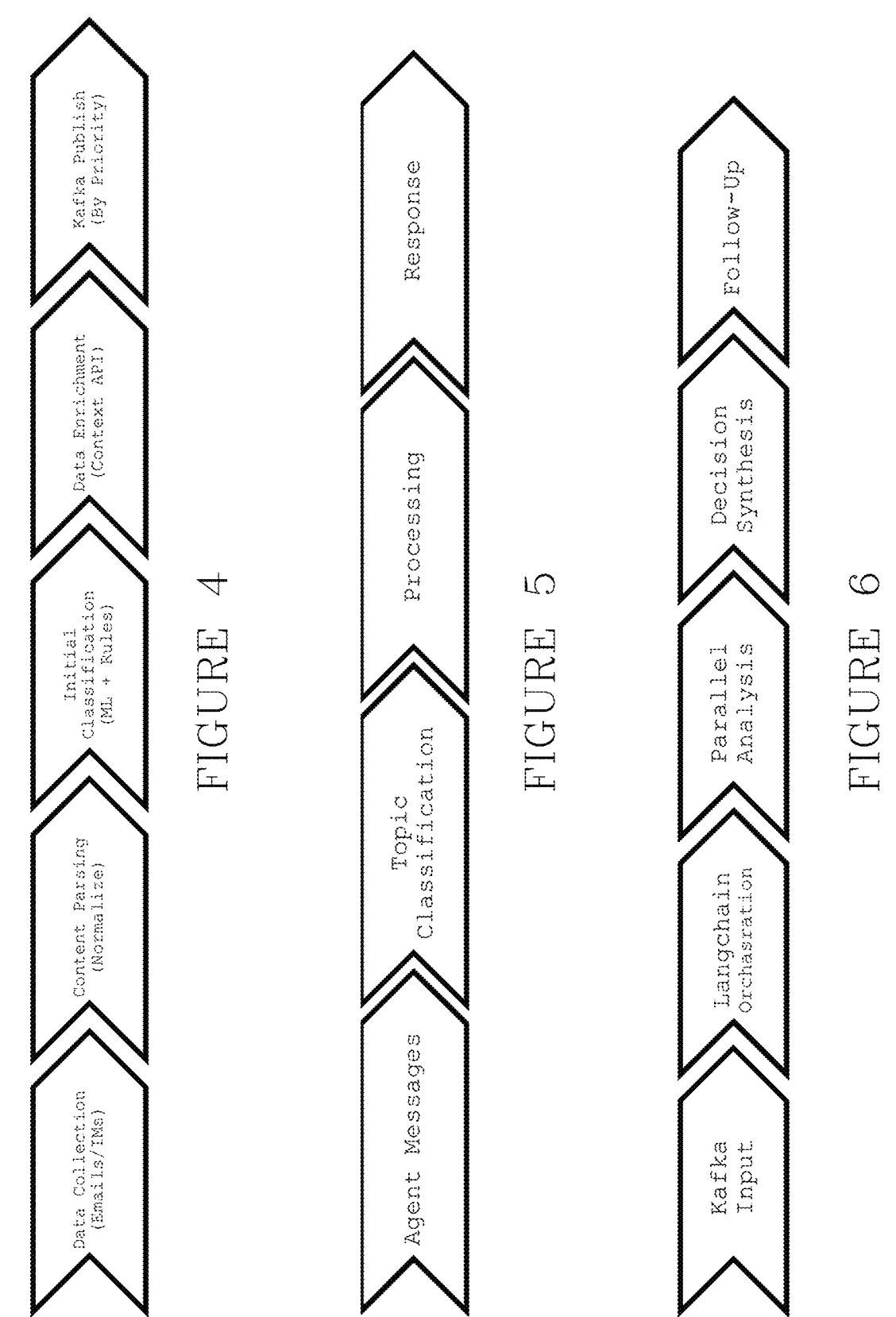
FIG. 4 is a flow diagram of an endpoint agent component of the exemplary embodiment of FIG. 3.
FIG. 5 is a flow diagram of a streaming component of the exemplary embodiment of FIG. 3.
FIG. 6 is a flow diagram of a processing component of the exemplary embodiment of FIG. 3.

As shown in FIG. 4, a lightweight Agent module may be installed on each endpoint device (e.g., laptop, desktop, mobile device, thin client). This Agent is configured for multi-channel data acquisition, parsing incoming emails, instant messages, and collaboration tool communications in real time. It may utilize pluggable connectors to support various message formats and protocols, normalizing content via content extraction and canonicalization techniques.

Initial classification within the Agent may employ a hybrid rules-and-lightweight-ML engine. Rule-based processing can use defined heuristics (e.g., sender whitelists/blacklists, regular expression matching on headers or text for risk patterns) for rapid triage, providing immediate "critical/high/normal" labels for further processing. The rules engine may be tuned for minimal computational overhead (e.g., <1 MB memory, <10% CPU utilization) to avoid impacting endpoint performance. Lightweight on-agent machine learning can reinforce rules when ambiguity arises, e.g., via decision trees or logistic regression models trained for the endpoint's typical communication context.

The Agent may further enrich message data by calling local or remote APIs to augment user identity (e.g., Active Directory integration), positional context (role/group queries), and historical behavioral data. Context enrichment may include extracting device location, job function, and access control attributes, providing richer feature vectors downstream.

Following classification and enrichment, the Agent may publish structured records (including message content, features, and priority label) to a streaming backend, as described below.

Streaming Component—Prioritized Message Routing

FIG. 5 shows the prioritized streaming architecture, implemented with a messaging pipeline such as Apache Kafka, an open-source distributed event streaming platform suitable for high-performance data pipelines, streaming analytics, data integration, and mission-critical applications.

According to FIG. 5, the message flow logic may be as follows:

1. Agent publishes to appropriate topic based on initial classification.
2. Manager consumes from priority topics, processes, publishes to new classified topic.
3. Follow-up consumes responses and execute.

TABLE 1

| Kafka system architecture with three core topics | |
| --- | --- |
| Topic | Consumer Group |
| Critical | manager-critical (6 inst) |
| High | manager-high (6 inst) |
| Normal | manager-normal (6 inst) |

The system configures multiple logical topics, each representing priority classes (critical, high, normal). The Agent, acting as a priority-aware producer, tags outgoing messages with priority metadata embedded in headers. Message queue partitioning maps these priorities to dedicated topics or partitions.

A dynamic scheduling algorithm on the endpoint side may ensure that high-priority messages are always processed ahead of lower-priority ones, enforcing low latency for urgent threats. Fault-tolerant logic allows the system to reroute or reassign consumer resources under high load or component failure, ensuring critical alerts are never dropped. Message status, processing times, and system health metrics are continually monitored and sent to the analytics backend.

Consumers (Processing Managers) may be organized in groups, each subscribing preferentially to one or more priority queues. As used herein, the term "consumers" may refer to one or more software components, processes, or modules within the system architecture that subscribe to, retrieve, and process data from streaming queues, message brokers, or data pipelines. These consumers may be configured to receive messages published by other system components (such as endpoint agents or classification engines), prioritize message handling according to risk or other attributes, execute further processing tasks (such as advanced analysis, threat classification, or response generation), and optionally supply feedback or processed data to downstream analytics or retraining pipelines. The consumers may operate in parallel, be organized in groups to increase throughput and reliability, and may dynamically scale or reprioritize based on system load and operational requirements.

Processing Manager (Component)—Contextual Analysis and Threat Synthesis

As depicted in FIG. 6, the Processing Manager orchestrates advanced, multi-stage threat analysis using an AI orchestration framework, such as LangChain or similar. LangChain is an open, composable framework that provides a standard interface for every model, tool, and database, enabling building adaptable LLM software applications.

The primary role of the Processing Manager is to calculate final "color" (risk) classification (Green/Orange/Red) based on multi-factor analysis. The color calculation may generally involve the following steps:

1. Context Assembly (taking, for example, around 20 ms): Gather user profiles, org data, communication history.
2. Multi-Model Analysis (taking, for example, around 50 ms): LLM content analysis and Utilities validation.
3. Score Synthesis (taking, for example, around 10 ms): Weight all factors into final classification.
4. Confidence Scoring: Determine certainty level for action execution.

Processing begins with context assembly: retrieving comprehensive user profiles (from identity services), compiling prior communication history (from system logs or local datastores), and associating organizational metadata. This can involve contextual joins and memory management across active sessions.

Next, the message is dispatched in parallel to multiple analytical models:

First, LLM-based Content Analysis: A large language model (LLM), possibly accessed via a secured inference endpoint, examines full message context for semantic, syntactic, and meta-contextual anomalies. It leverages prompt engineering and retrieval-augmented generation (RAG) techniques to reference up-to-date threat intelligence databases or emerging attack signatures.

Second, Utility Validators: Dedicated classifiers enforce policy compliance (e.g., Data Loss Prevention, DLP), validate identity or geo-location (e.g., via mapping IP addresses to issued employee travel calendars), and check business logic consistency.

The outputs of these models may be synthesized via weighted scoring—wherein content similarity, style deviation, contextual mismatch, and policy violations are each assigned confidence intervals. The system computes a final trust score, mapped to "Green" (trusted), "Orange" (verification required), or "Red" (high risk/block) classifications. The pipeline supports explainability by logging decision trails and contributing factor weights for each verdict.

All analytical actions are orchestrated to meet strict SLA requirements for response time, enabled by resource pooling, task prioritization, and AI/ML model optimization for inference speed.

LLM Engine Component—Centralized and Specialized AI Analysis

Figure 7:
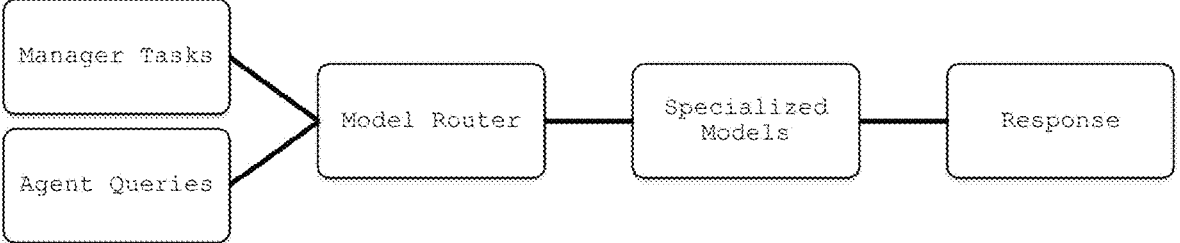
FIG. 7 is a block diagram of an LLM engine of the exemplary embodiment of FIG. 3.

Turning to FIG. 7, the LLM Engine may be deployed as a centrally managed, multi-model inference platform.

Manager tasks and Agent queries may be transmitted to a Model Router, which is an algorithm configured to route these tasks and queries to the most relevant model out of multiple specialized machine learning (e.g., LLM) models.

Figure 12:
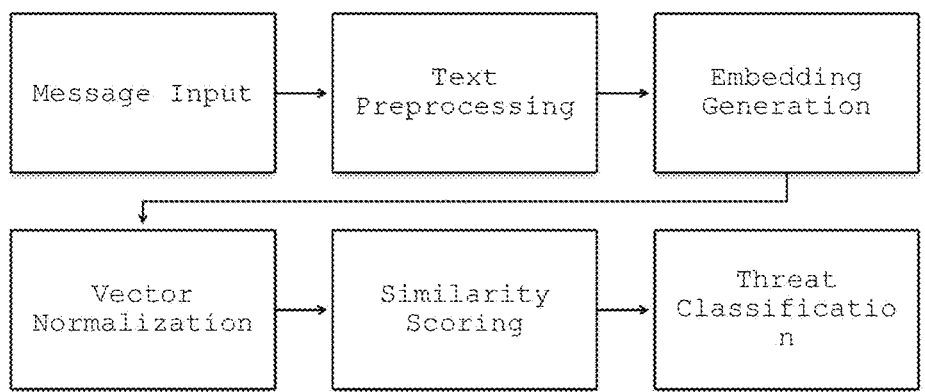
FIG. 12 is a flowchart of an embedding pipeline of the exemplary embodiment of FIG. 3.

In certain embodiments, the LLM Engine may incorporate a vectorization architecture designed to enable semantic similarity search and context-aware threat detection by representing communications in high-dimensional vector space. As shown in FIG. 12, this architecture may include an embedding pipeline with a Message Input, Text Preprocessing, Embedding Generation, Vector Normalization, Similarity Scoring, and/or Threat Classification. The embedding pipeline may convert incoming message data into several types of vector representations. Text from incoming communications may undergo preprocessing and be transformed into embeddings using, for example, natural language processing models. Multiple embedding vectors may be generated for each message, capturing aspects such as style, content, and/or contextual information relevant to the organizational environment.

The system may maintain a vector database comprising known attack patterns. These may include—but are not limited to—vectors representing business email compromise signatures, phishing language patterns, templates for urgent requests, authority impersonation styles, and/or data exfiltration requests. The database may expand dynamically as new threat patterns are detected.

For each incoming message, the following real-time vector-enhanced classification pipeline may be executed (with indicative example durations), optionally as part of the LLM engine:

1. Input Vectorization (e.g., 10 ms): The message may be converted into multiple vector representations corresponding to its content, style, and context.
2. Similarity Search (e.g., 15 ms): The system may perform a similarity search by querying both baseline vectors representing normal executive communications and the threat pattern vector database. Cosine similarity or other distance metrics may be used to score the degree of match.
3. Multi-Vector Scoring (e.g., 10 ms): Similarity scores may be weighted by type: content similarity, style similarity, and/or context similarity (for example, 40%, 35%, and 25% contributions, respectively) to generate an aggregate threat score.
4. Threshold Classification (e.g., 5 ms): Dynamic thresholds, which may be adjusted according to the communicating user's risk profile or organizational sensitivity, may be applied to generate a confidence score and assign the message to a risk class, such as Green (trusted), Orange (needs verification), or Red (block/quarantine).

The vectorization pipeline may be designed to achieve targets such as query latency of less than 20 ms per similarity search, throughput of at least 10,000 queries per second, and real-time propagation of index updates within <100 ms. Storage may grow incrementally with new patterns (e.g., 500 MB per day).

The system may support a periodic (e.g., daily) vector update pipeline, for example at off-peak times (such as 2 AM), to retrain embeddings based on the latest communication patterns, refresh executive baseline vectors, and update the threat pattern database. Incremental updates may be performed in real time for new executives, emerging threats, or compensating for shifts in communication style (style drift). Performance validation may incorporate A/B testing, with rollback capabilities in the event of degraded accuracy, and ongoing monitoring with alerting mechanisms for system operators.

Utilities Component—Cross-System Services

Figure 8:
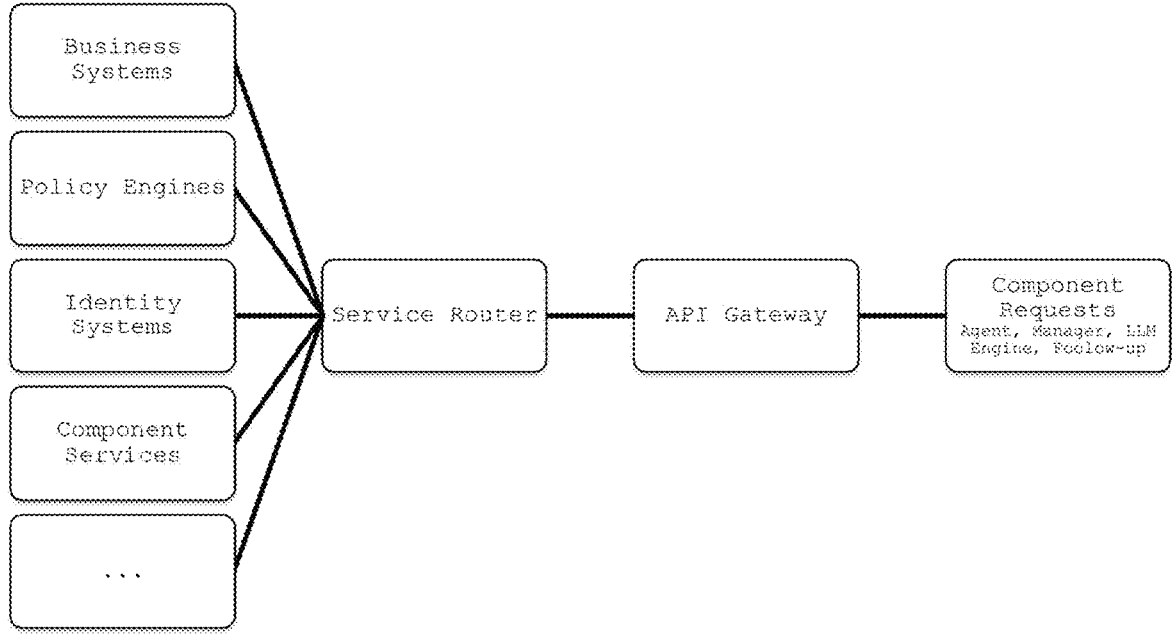
FIG. 8 is a block diagram of a utilities component of the exemplary embodiment of FIG. 3.

With reference to FIG. 8, a Utilities component may provide centralized cross-system services required by various subsystems of the overall architecture. This component may function as a shared services gateway, exposing service APIs and routing logic for integration with both internal and external resources.

The Utilities component may comprise an API gateway and a service router, designed to mediate and direct service requests from other functional modules, such as the Agent, Manager (Processing component), LLM Engine, and Follow-up (Responder) components. In some configurations, external business systems, policy engines, and identity systems may also interface directly through this component.

Service categories accessible via the Utilities component may include, but are not limited to, the following:

1. Agent Services: These services may facilitate user identity validation through an authentication API, verify user or device geolocation in conjunction with organizational calendars, and authenticate communication channels.
2. Manager (Processing) Services: The Manager may access organizational hierarchy APIs to determine reporting structures, utilize a central policy rule engine for compliance and authorization checks, query a business context service for operational or workflow context, and invoke risk scoring algorithms to supplement analysis.
3. LLM Engine Services: For advanced AI processing, services may include training data management, storage and retrieval of model artifacts, running feature engineering pipelines, and monitoring AI model performance metrics.
4. Follow-up (Responder) Services: Response and escalation workflows may be supported by authentication providers (such as two-factor authentication and Single Sign-On), integration with communication APIs (for example, email, instant message, SMS, and voice messaging), access to an escalation workflow engine for advanced incident handling, and invocation of audit logging services for compliance and monitoring.

The core service infrastructure of the Utilities component may further include:

1. Identity Management: Integration with enterprise identity directories and federation systems, such as Active Directory, LDAP, or Okta, to support organization-wide user identification, authentication, and authorization.
2. Policy Engine: Services for centralized policy management, including compliance checking with organizational and regulatory requirements, which may be updated dynamically as rules evolve.
3. Business Context: Access to business systems such as project management databases, organizational calendars, and human resources information systems, enabling context-aware risk assessments and response actions.
4. External APIs: Connectivity to external communication providers and threat intelligence feeds, enabling expanded information sources for verification and policy enforcement.
5. Monitoring: Facilities for health checks, performance metric collection, and service discovery, ensuring dependable operation and facilitating system scaling or fault recovery as necessary.

By providing these centralized services and integrations, the Utilities component supports seamless collaboration between disparate system modules, efficient access to shared enterprise resources, and robust enforcement of organizational policies and security measures.

Follow-Up (Responder) Component—Response Execution and Feedback Loop

Figures 9, 10:
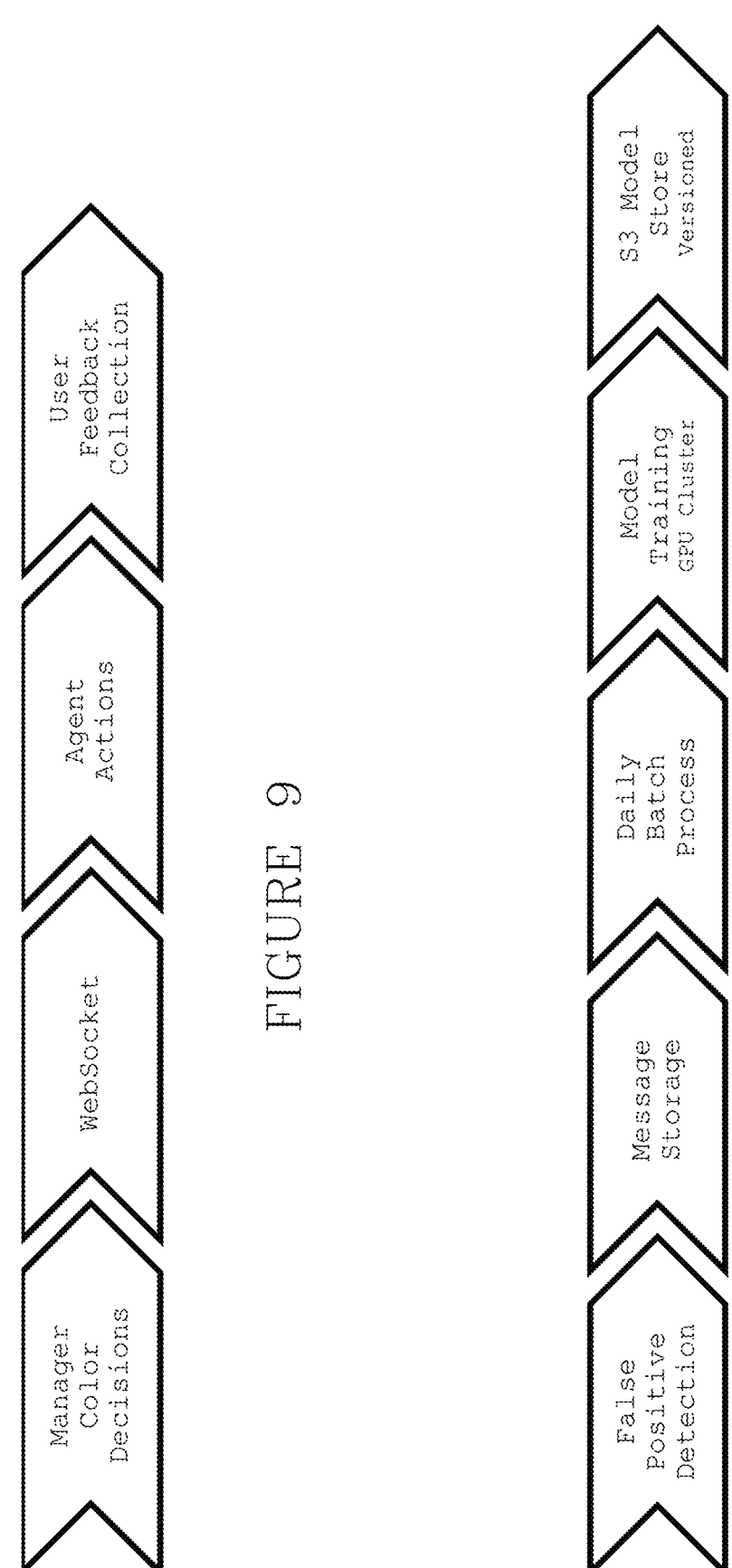
FIG. 9 is a flow diagram of a follow-up component of the exemplary embodiment of FIG. 3.
FIG. 10 is a flow diagram of a training data pipeline of the follow-up component of the exemplary embodiment of FIG. 3.

Referring now to FIG. 9, a Follow-up (Responder) component may be configured to execute threat response actions based on classification outputs generated by upstream analysis modules. This component may handle message disposition and trigger downstream processes for feedback collection and model retraining.

The Follow-up component may support multiple risk-based action types, which may include:

"Green" actions: Silently allowing the message to proceed, with the outcome optionally used to improve baseline risk models ("baseline learning").

"Orange" actions: Triggering additional verification steps such as two-factor authentication, voice verification, and/or email confirmation before message delivery or user action is permitted.

"Red" actions: Quarantining the message, escalating to security teams, and/or initiating protective measures including user or account protection.

An action implementation table may be maintained to map classification outcomes to specific response workflows. For example, Green messages may flow directly to recipients, Orange actions may interface with third-party authentication providers or in-house verification services, and Red actions may automatically alert administrators, lock accounts, or trigger SIEM/incident management workflows.

To reduce false positives and continuously improve threat detection, the Follow-up component may establish a training data pipeline comprising the following steps, as illustrated in FIG. 10:

1. Collection: User-flagged false positives and associated context may be captured and recorded for analysis.
2. Daily Processing: A scheduled batch job, possibly executed during off-peak periods (e.g., 2 AM), may process the accumulated false positive data and feedback.
3. Model Training: The processed feedback and examples may be used to fine-tune existing models, specifically introducing new negative examples to improve discriminative power.
4. Validation: Updated models may be validated using dedicated test or holdout data sets to confirm performance improvements or stability.

5. Deployment: Validated models may be deployed to a central repository (e.g., an S3 model store) for system-wide update across endpoints or components.

6. Rollback: In some embodiments, versioned backups of prior models may be maintained to enable rapid roll-back in the event of performance degradation or unforeseen errors.

The Follow-up component may interact via secure channels (e.g., WebSocket) with the Manager, endpoints, and users to relay actions, gather real-time feedback, and coordinate training data collection. User overrides, confirmations, and security event outcomes may be fed directly into the analytics and retraining pipeline to ensure prompt model adaptation to new patterns or evolving threats.

Consumer Analytics Component—Continuous Learning and Improvement

Figure 11:
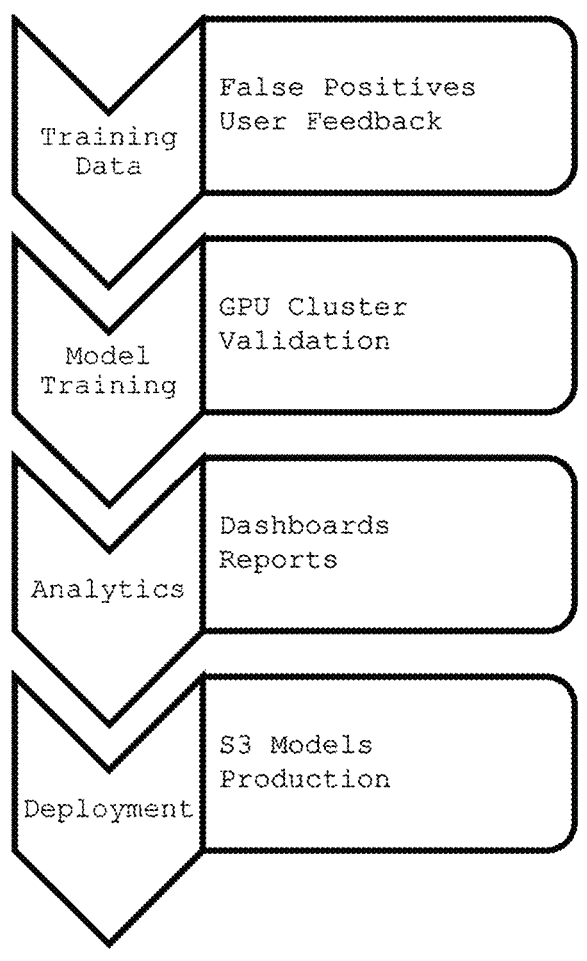
FIG. 11 is a flow diagram of a consumer component of the exemplary embodiment of FIG. 3.

With reference to FIG. 11, a Consumer component may be provided to process training data and generate business analytics in support of continuous improvement and adaptive learning across the system architecture. As depicted in the figure, this component may function as a centralized analytics and retraining pipeline.

The Consumer component may aggregate various sources of training data, which may include, but are not limited to, user feedback, detected false positives, and outcomes generated by prior classification and incident response actions. The component may access a persistent data store, such as a relational database (for example, PostgreSQL), to collect and maintain this data on a scheduled or event-driven basis.

A daily batch process may be implemented, for instance at an off-peak time (such as 2 AM), to perform the following sequence:

1. Data Collection: The process may retrieve newly accumulated false positives and user-reported feedback stored in the relevant database tables.

2. Data Validation and Cleaning: The gathered training data may be validated, checked for consistency, and cleaned to remove duplicates, errors, or outlier events that could affect training quality.

3. Model Retraining: Clean and validated data may be supplied to model training jobs, which may operate on dedicated hardware (such as a GPU cluster). Statistical and machine learning models, as well as neural network architectures (including those supporting LLM-based threat detection), may be retrained to account for new usage patterns and updated user behavior.

4. Model Validation: Newly trained models may be tested against one or more validation data sets to assess performance, including accuracy, recall, false positive, and false negative rates.

5. Model Deployment: Validated models may then be deployed to a production artifact repository, such as cloud-based object storage (for example, Amazon S3), and updates may be orchestrated system-wide so that all relevant system components, such as endpoints, benefit from the retraining.

The Consumer component may generate analytics dashboards and summary reports, which may be made available to administrators and organizational stakeholders for review and risk assessment. Metrics may include detection rates, system usage, user engagement, and the frequency of model updates.

In some embodiments, the Consumer component may further monitor data pipeline health, job execution status, and/or performance metrics. Alerts or status indicators may be presented on management dashboards to support operational visibility and rapid troubleshooting.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
    automatically receiving an electronic message at an endpoint device associated with an organization;
    automatically analyzing the electronic message by a local agent executed on the endpoint device, based on: (i) data sensitivity associated with the content of the electronic message, (ii) communication behavior baselines of a sender and a recipient of the electronic message, (iii) job roles of the sender and the recipient, and an organizational hierarchy listing the job roles, and (iv) one or more enterprise security policies of the organization;
    automatically classifying the electronic message into one of a plurality of trust levels by the local agent, wherein the trust levels comprise at least: (a) a trusted level permitting fulfillment of the message, (b) a suspicious level requiring human verification, and (c) a blocked level preventing fulfillment of the message unless explicitly approved;
    automatically generating, by the local agent, a real-time alert or action at the endpoint device based on the classification, the alert or action comprising at least one of: (i) permitting the message to be viewed by the recipient, (ii) requiring additional verification before permitting the message to be viewed by the recipient, (iii) blocking the message from being reviewed by the recipient, or (iv) displaying, to the recipient, an indicator respective of the classification;
    automatically transmitting, by the local agent, metadata associated with the electronic message and its classification to a centralized machine learning engine; and
    automatically updating, by the centralized machine learning engine, one or more machine learning models based on aggregated metadata received from a plurality of endpoint devices, wherein the one or more updated machine learning models are used to improve subsequent classification of electronic messages at the endpoint devices.

2. The method of claim 1, wherein the analyzing of the electronic message by the local agent comprises operating a Large Language Model (LLM).

3. The method of claim 2, wherein the operating of the LLM comprises evaluating data sensitivity of the message content, by detecting at least one of: confidential terms, financial data, or personally identifiable information.

4. The method of claim 2, wherein the operating of the LLM comprises evaluating communication behavior baselines for the sender and the recipient by comparing at least one or: historical patterns, typical linguistic characteristics, tone, or structure, against the electronic message.

5. The method of claim 2, wherein the operating of the LLM comprises evaluating job roles of the sender and recipient respective of organizational hierarchy information, by querying a directory service of the organization.

6. The method of claim 2, wherein the operating of the LLM comprises retrieving and evaluating enterprise security policies applicable to the sender and the recipient.

7. The method of claim 1, further comprising automatically operating the local agent to normalize protocol-specific message content and metadata originating from a plurality of communication channels by extracting header fields, message bodies, attachments, and contextual signals into a standardized data structure configured for automated analysis.

8. The method of claim 1, further comprising automatically operating the local agent to apply both rule-based filters and at least one lightweight machine learning classifier to the electronic message, to assign a priority label to the electronic message prior to said analyzing.

9. The method of claim 1, wherein the centralized machine learning engine:
    automatically executes a vectorization pipeline that generates multi-dimensional embeddings of content, style, and recipient context of the electronic message, using a transformer-based large language model; and
    automatically compares the generated multi-dimensional embeddings to a database of threat pattern vectors, to compute a similarity score indicative of potential impersonation and/or potential data exfiltration.

10. The method of claim 1, wherein, responsive to classification of the electronic message to the suspicious or the blocked trust levels, the local agent or central server:
    automatically initiates an authentication workflow comprising at least one of: two-factor authentication, biometric verification, a challenge-response protocol, or escalation to a designated security officer; and
    automatically records the authentication outcome as feedback for subsequent retraining of the one or more machine learning models.

11. A computer program product comprising a non-transitory computer-readable storage medium having program code embodied therewith, the program code executable by at least one hardware processor to:
    automatically receive an electronic message at an endpoint device associated with an organization;
    automatically analyze the electronic message by a local agent executed on the endpoint device, based on: (i) data sensitivity associated with the content of the electronic message, (ii) communication behavior baselines of a sender and a recipient of the electronic message, (iii) job roles of the sender and the recipient, and an organizational hierarchy listing the job roles, and (iv) one or more enterprise security policies of the organization;
    automatically classify the electronic message into one of a plurality of trust levels by the local agent, wherein the trust levels comprise at least: (a) a trusted level permitting fulfillment of the message, (b) a suspicious level requiring human verification, and (c) a blocked level preventing fulfillment of the message unless explicitly approved;

automatically generate, by the local agent, a real-time alert or action at the endpoint device based on the classification, the alert or action comprising at least one of: (i) permitting the message to be viewed by the recipient, (ii) requiring additional verification before permitting the message to be viewed by the recipient, (iii) blocking the message from being reviewed by the recipient, or (iv) displaying, to the recipient, an indicator respective of the classification;

automatically transmit, by the local agent, metadata associated with the electronic message and its classification to a centralized machine learning engine; and automatically update, by the centralized machine learning engine, one or more machine learning models based on aggregated metadata received from a plurality of endpoint devices, wherein the one or more updated machine learning models are used to improve subsequent classification of electronic messages at the endpoint devices.

12. The computer program product of claim 11, wherein the analyzing of the electronic message by the local agent comprises operating a Large Language Model (LLM).

13. The computer program product of claim 12, wherein the operating of the LLM comprises evaluating data sensitivity of the message content, by detecting at least one of: confidential terms, financial data, or personally identifiable information.

14. The computer program product of claim 12, wherein the operating of the LLM comprises evaluating communication behavior baselines for the sender and the recipient by comparing at least one or: historical patterns, typical linguistic characteristics, tone, or structure, against the electronic message.

15. The computer program product of claim 12, wherein the operating of the LLM comprises evaluating job roles of the sender and recipient respective of organizational hierarchy information, by querying a directory service of the organization.

16. The computer program product of claim 12, wherein the operating of the LLM comprises retrieving and evaluating enterprise security policies applicable to the sender and the recipient.

17. The computer program product of claim 11, wherein the program code is further executable to automatically operate the local agent to normalize protocol-specific message content and metadata originating from a plurality of communication channels by extracting header fields, message bodies, attachments, and contextual signals into a standardized data structure configured for automated analysis.

18. The computer program product of claim 11, wherein the program code is further executable to automatically operate the local agent to apply both rule-based filters and at least one lightweight machine learning classifier to the electronic message, to assign a priority label to the electronic message prior to said analyzing.

19. The computer program product of claim 11, wherein the centralized machine learning engine:

automatically executes a vectorization pipeline that generates multi-dimensional embeddings of content, style, and recipient context of the electronic message, using a transformer-based large language model; and automatically compares the generated multi-dimensional embeddings to a database of threat pattern vectors, to compute a similarity score indicative of potential impersonation and/or potential data exfiltration.

20. The computer program product of claim 11, wherein, responsive to classification of the electronic message to the suspicious or the blocked trust levels, the local agent or central server:

automatically initiates an authentication workflow comprising at least one of: two-factor authentication, biometric verification, a challenge-response protocol, or escalation to a designated security officer; and automatically records the authentication outcome as feedback for subsequent retraining of the one or more machine learning models.

* * * * *